US012266286B2

(12) United States Patent
Ahn

(10) Patent No.: US 12,266,286 B2
(45) Date of Patent: Apr. 1, 2025

(54) DISPLAY DEVICE

(71) Applicant: LG ELECTRONICS INC., Seoul (KR)

(72) Inventor: Sang Hyuk Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/224,437

(22) Filed: Jul. 20, 2023

(65) Prior Publication Data

US 2024/0363049 A1 Oct. 31, 2024

(30) Foreign Application Priority Data

Apr. 25, 2023 (KR) ........................ 10-2023-0053816

(51) Int. Cl.
*G09G 3/20* (2006.01)

(52) U.S. Cl.
CPC ... *G09G 3/2007* (2013.01); *G09G 2320/0247* (2013.01); *G09G 2320/0673* (2013.01); *G09G 2320/0693* (2013.01); *G09G 2354/00* (2013.01)

(58) Field of Classification Search
CPC ......... G09G 3/2007; G09G 2320/0247; G09G 2320/0674; G09G 2320/0694; G09G 2354/00
See application file for complete search history.

(56) References Cited

U.S. PATENT DOCUMENTS

| | | | | |
|---|---|---|---|---|
| 10,242,623 B2 * | 3/2019 | Han | G09G 3/3233 | |
| 10,964,286 B2 * | 3/2021 | Li | G09G 3/3696 | |
| 2007/0216635 A1 * | 9/2007 | Kondoh | G09G 3/3629 | 345/101 |
| 2015/0228213 A1 * | 8/2015 | Cho | G01J 3/506 | 345/690 |
| 2015/0261233 A1 * | 9/2015 | Duan | G05F 1/463 | 345/101 |
| 2023/0296935 A1 * | 9/2023 | Li | G02F 1/133382 | 349/161 |

FOREIGN PATENT DOCUMENTS

| | | |
|---|---|---|
| JP | 2012189765 | 10/2012 |
| JP | 2014164099 A * | 9/2014 |
| KR | 1020160082813 | 7/2016 |

OTHER PUBLICATIONS

Korean Intellectual Property Office Application No. 10-2023-0053816, Office Action dated Apr. 12, 2024, 7 pages.

* cited by examiner

*Primary Examiner* — Kenneth Bukowski
(74) *Attorney, Agent, or Firm* — LEE, HONG, DEGERMAN, KANG & WAIMEY

(57) ABSTRACT

Disclosed is a display device including a display, a power supply circuit configured to supply a display voltage to the display, and a controller configured to obtain a calibrated voltage value for correcting the display voltage based on a temperature of the display device and output a voltage to the display based on the temperature of the display device and the calibrated voltage value.

15 Claims, 11 Drawing Sheets

DISPLAY DEVICE

CROSS-REFERENCE TO RELATED APPLICATION(S)

Pursuant to 35 U.S.C. § 119, this application claims the benefit of earlier filing date and right of priority to Korean Application No. 10-2023-0053816, filed on Apr. 25, 2023, the contents of which are all incorporated by reference herein in its entirety.

BACKGROUND OF THE INVENTION

1. Field of the Invention

The present disclosure relates to a display device. Specifically, the present disclosure relates to a display device for solving a flicker phenomenon caused by a variation in voltage of a display.

2. Discussion of the Related Art

Digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users can actively select the types of watching programs, the watching time, and the like. The IPTV and smart TV services can provide various additional services, such as Internet search, home shopping, and online games, based on such interactivity.

Depending on the aging time of a TV, heating may occur in the TV. Heating of the TV may occur due to changes in use environments or deterioration of internal components.

Due to heating of the TV, a voltage for displaying a screen on the TV may be changed. When a voltage for displaying a screen on the TV is changed, a luminance difference between frames of a video may occur. Accordingly, flicker noise may occur due to a luminance difference between frames.

A conventional TV has difficulty to prevent flicker noise caused by a change in the voltage. Accordingly, when flickering noise occurs, separate repairs are required, which is cumbersome and costly.

SUMMARY OF THE INVENTION

An object of the present disclosure is to calibrate a display voltage that fluctuates due to heating of a display device.

Another object of the present disclosure is to minimize a flicker phenomenon due to a variation in display voltage.

A display device according to an embodiment of the present disclosure may comprising a display, a power supply circuit configured to supply a display voltage to the display and a controller configured to obtain a calibrated voltage value for correcting the display voltage based on a temperature of the display device and output a voltage to the display based on the temperature of the display device and the calibrated voltage value.

A display device according to an embodiment of the present disclosure may obtain a final temperature of the display device when receiving a user input for turning off power of the display device, and output at least one gray pattern to the display to obtain the display voltage.

A display device according to an embodiment of the present disclosure may obtain the calibrated voltage value based on the obtained display voltage and store the final temperature and the calibrated voltage value.

A display device according to an embodiment of the present disclosure may convert the obtained display voltage into a digital value and obtain the calibrated voltage value using the digital value.

A display device according to an embodiment of the present disclosure may obtain an indication as to whether to execute a voltage training mode for calibrating the display voltage when receiving a user input for turning off the power of the display device.

A display device according to an embodiment of the present disclosure may obtain a user input for selecting one of a normal mode and a precision mode when obtaining an indication that the voltage training mode is to be executed and output the one gray pattern in the normal mode and output a plurality of gray patterns in the precision mode.

A display device according to an embodiment of the present disclosure may output a gray pattern having an intermediate gray level among the gray patterns in the normal mode.

A display device according to an embodiment of the present disclosure may output a plurality of gray patterns having preset gray level intervals in the precision mode.

A display device according to an embodiment of the present disclosure may output a voltage to the display based on a calibrated voltage value corresponding to a current temperature of the display device when the current temperature increases by not less than a preset reference temperature from an initial temperature of the display device.

A display device according to an embodiment of the present disclosure may output a voltage to the display based on a calibrated voltage value obtained at a final temperature equal to the current temperature.

A display device according to an embodiment of the present disclosure may output a voltage to the display based on a calibrated voltage value obtained at a final temperature closest to the current temperature.

A display device according to an embodiment of the present disclosure, the display voltage may include a common gamma voltage and a gamma voltage, the gamma voltage may include a positive gamma voltage and a negative gamma voltage, and the controller may calibrate at least one of the common gamma voltage, the positive gamma voltage, and the negative gamma voltage.

A display device according to an embodiment of the present disclosure may calibrate the display voltage such that a difference between the positive gamma voltage and the common gamma voltage is equal to a difference between the negative gamma voltage and the common gamma voltage.

A display device according to an embodiment of the present disclosure may calibrate the display voltage such that the common gamma voltage has an intermediate value between the positive gamma voltage and the negative gamma voltage.

A display device according to an embodiment of the present disclosure may calibrate the display voltage based on a variation in the positive gamma voltage and a variation in the negative gamma voltage.

A display device according to an embodiment of the present disclosure may obtain an average variation in the positive gamma voltage and an average variation in the negative gamma voltage, obtain a calibrated voltage value of the positive gamma voltage by subtracting the average variation from an initial voltage of the positive gamma voltage and obtain a calibrated voltage value of the negative gamma voltage by subtracting the average variation from an initial voltage of the negative gamma voltage.

According to the present disclosure, it is possible to compensate and output the voltage of the display based on the temperature of the display device when the display voltage fluctuates.

According to the present disclosure, a calibrated voltage value of a display voltage for each temperature may be automatically learned without interfering with a user's use of a display device.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
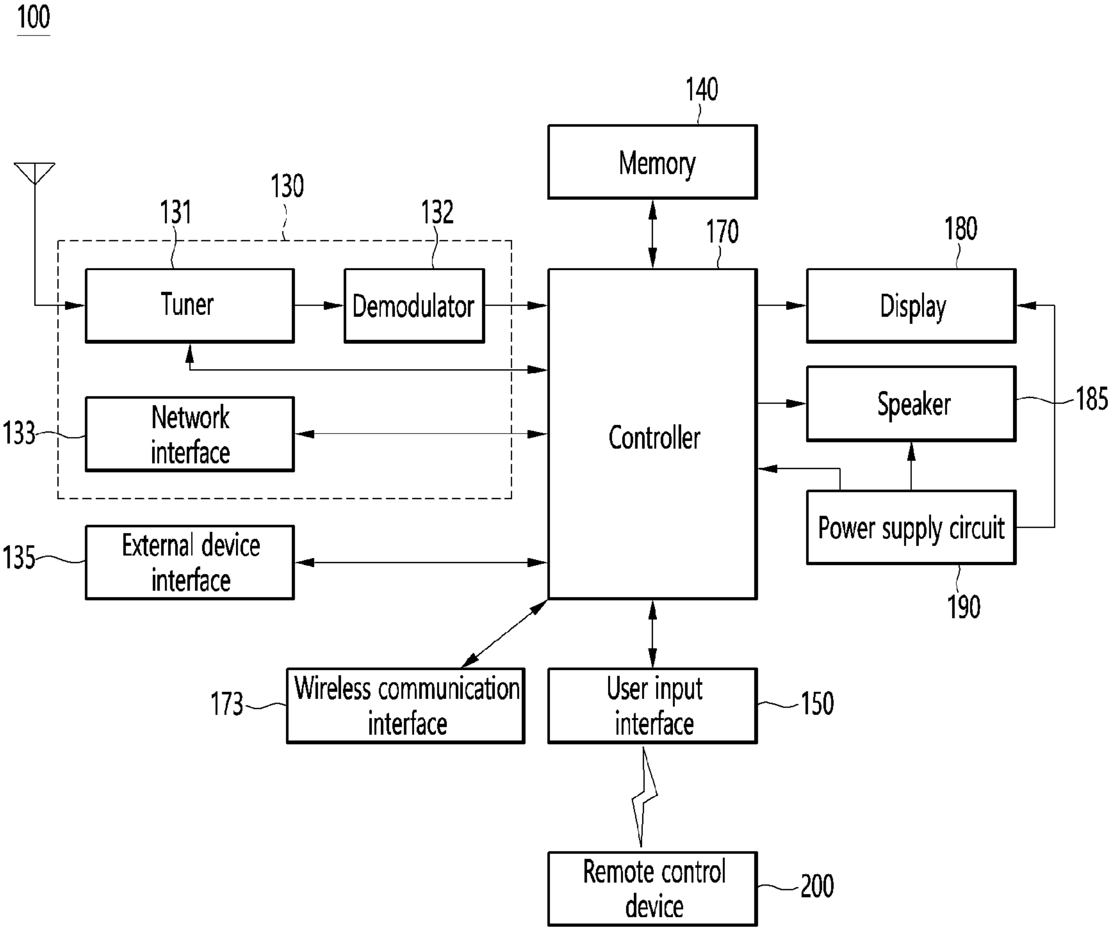
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 to 3.

Figure 2:
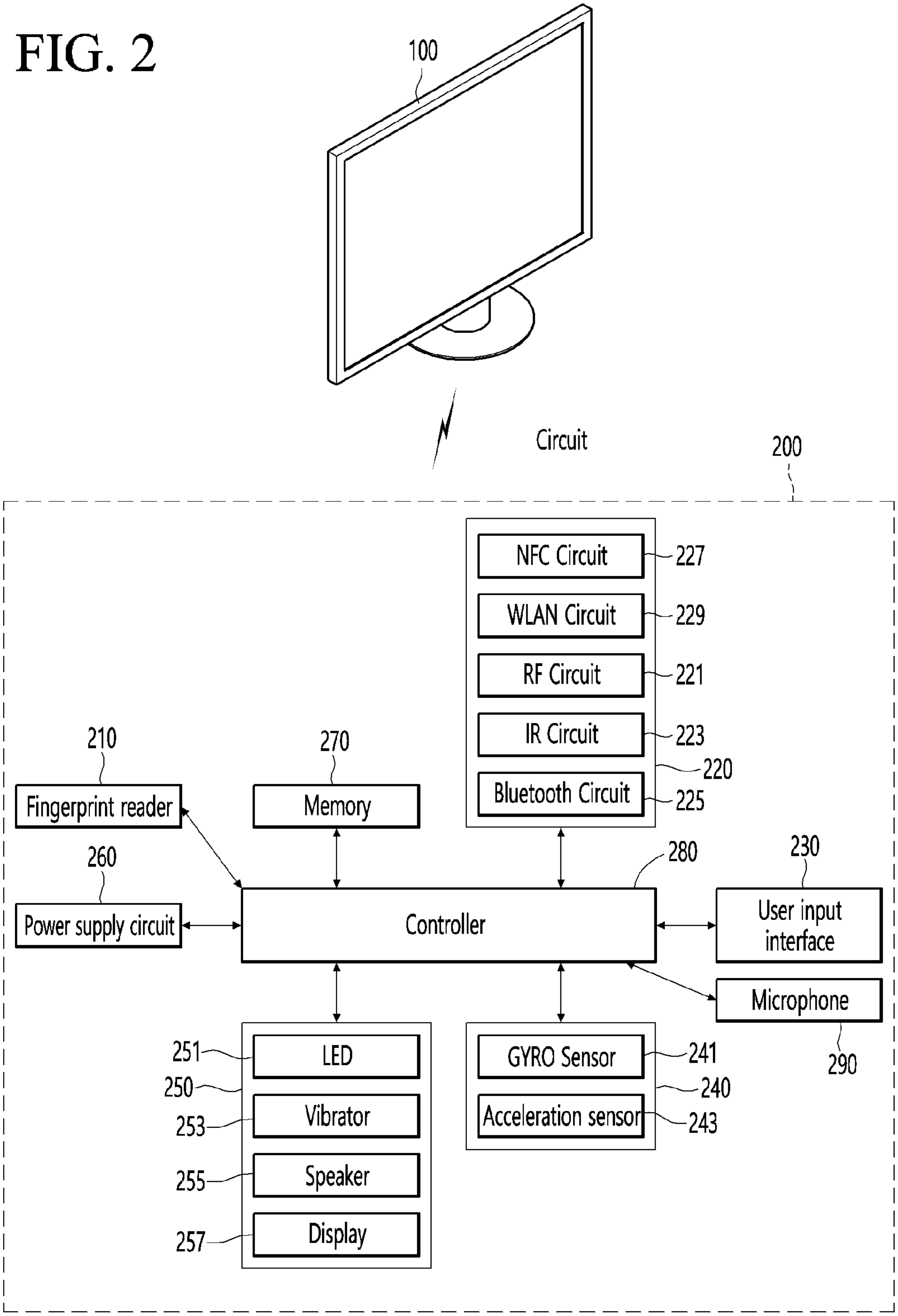
FIG. 2 is a block diagram illustrating a remote control device according to an embodiment of the present disclosure.
Figure 3:
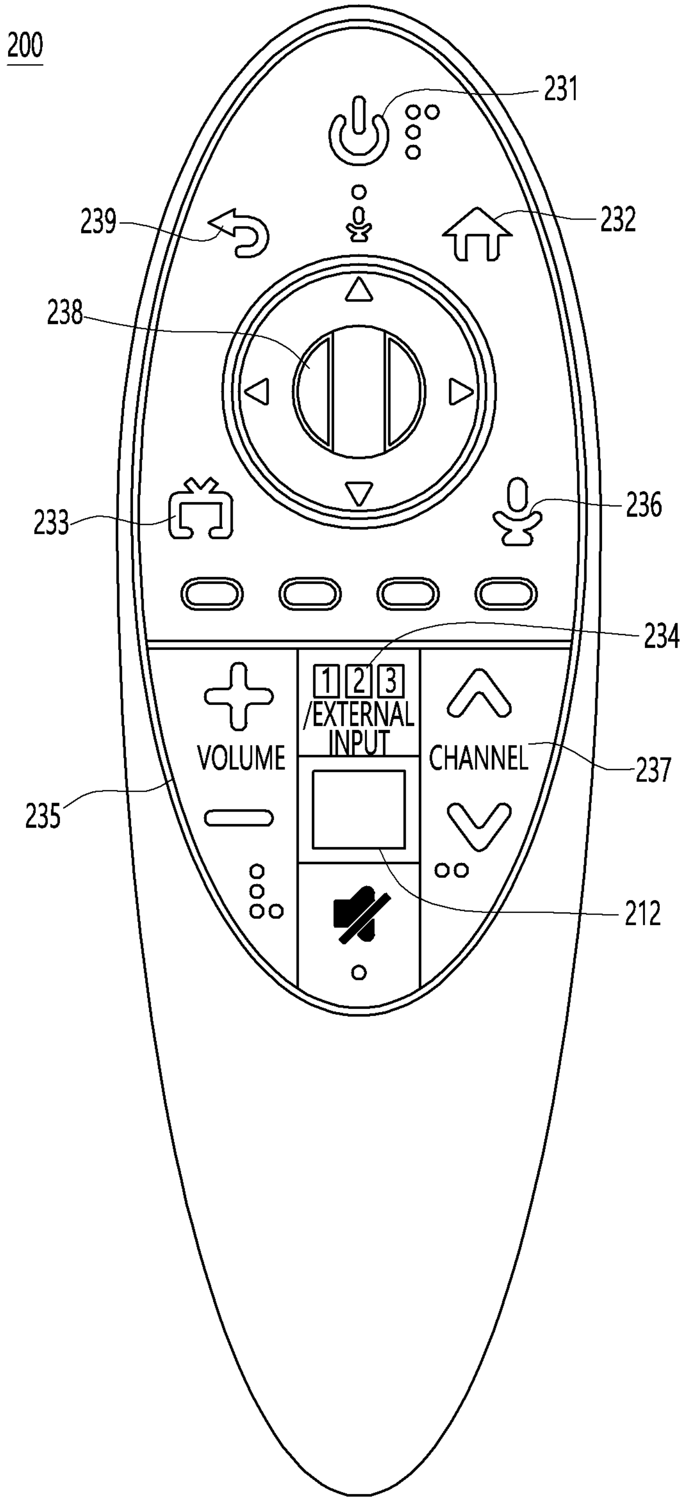
FIG. 3 is a view illustrating an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
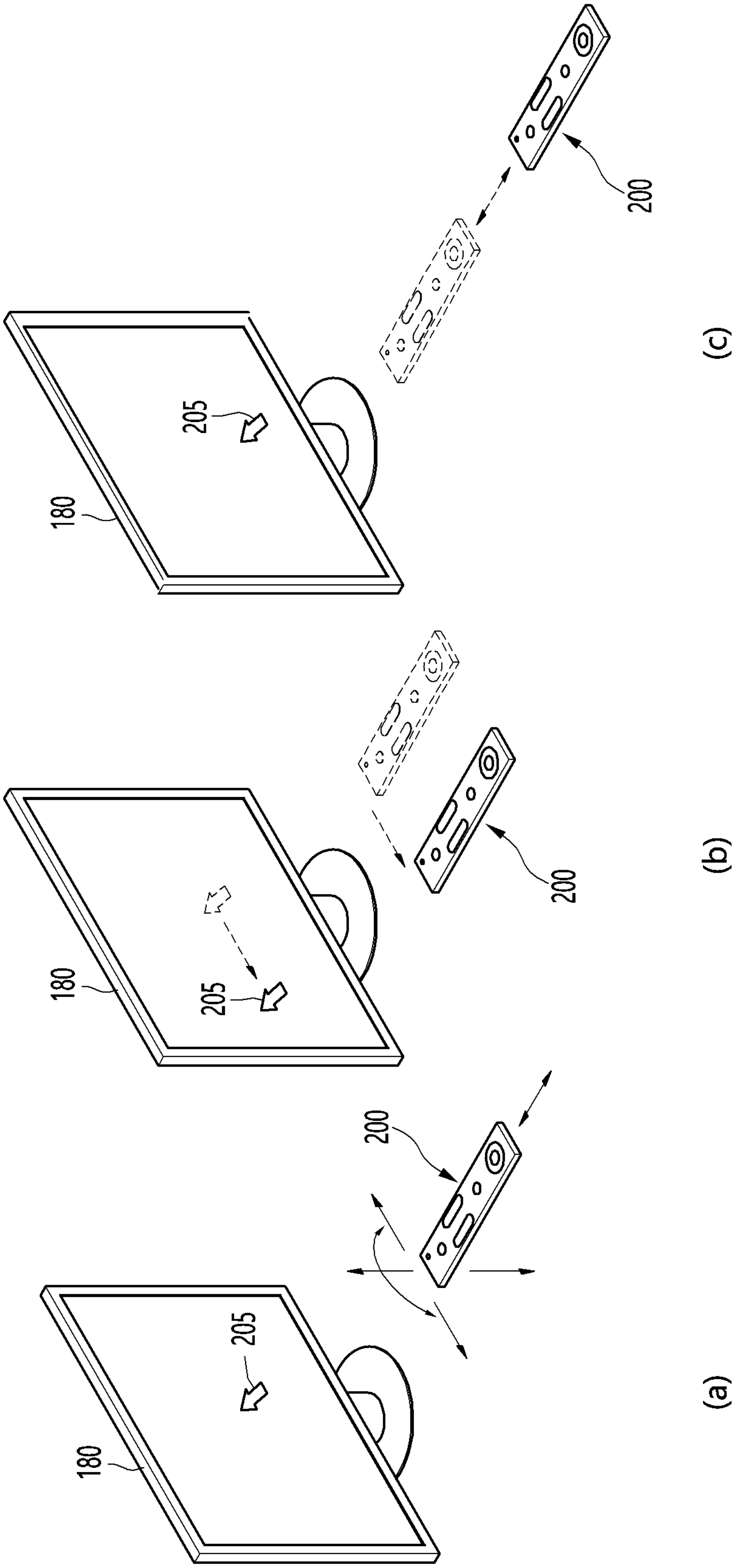
FIG. 4 is a view of utilizing a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

The display 180 may output a video based on a voltage supplied to the display 180. The voltage supplied to the display 180 may be a display voltage. The display 180 may include a liquid crystal display. The display voltage may be a voltage applied to a liquid crystal electrode.

The display voltage may include a common gamma voltage (VCOM) and a gamma voltage.

The common gamma voltage may be a reference voltage of a data sub-pixel.

The gamma voltage may be a voltage that is a data level of an R/G/B sub-pixel. Alternatively, the gamma voltage may be an analog data voltage of a sub-pixel.

The gamma voltage may include a positive gamma voltage and a negative gamma voltage.

The positive gamma voltage may be a data voltage of a positive period of a sub-pixel. Also, the negative gamma voltage may be a data voltage of a negative period of a sub-pixel.

The luminance of each frame of the display 180 may be the same or different depending on the display voltage.

First, with reference to FIG. 5, a case in which luminance of each frame of a video displayed by the display apparatus 100 according to an embodiment of the present disclosure is the same will be described.

Figure 5:
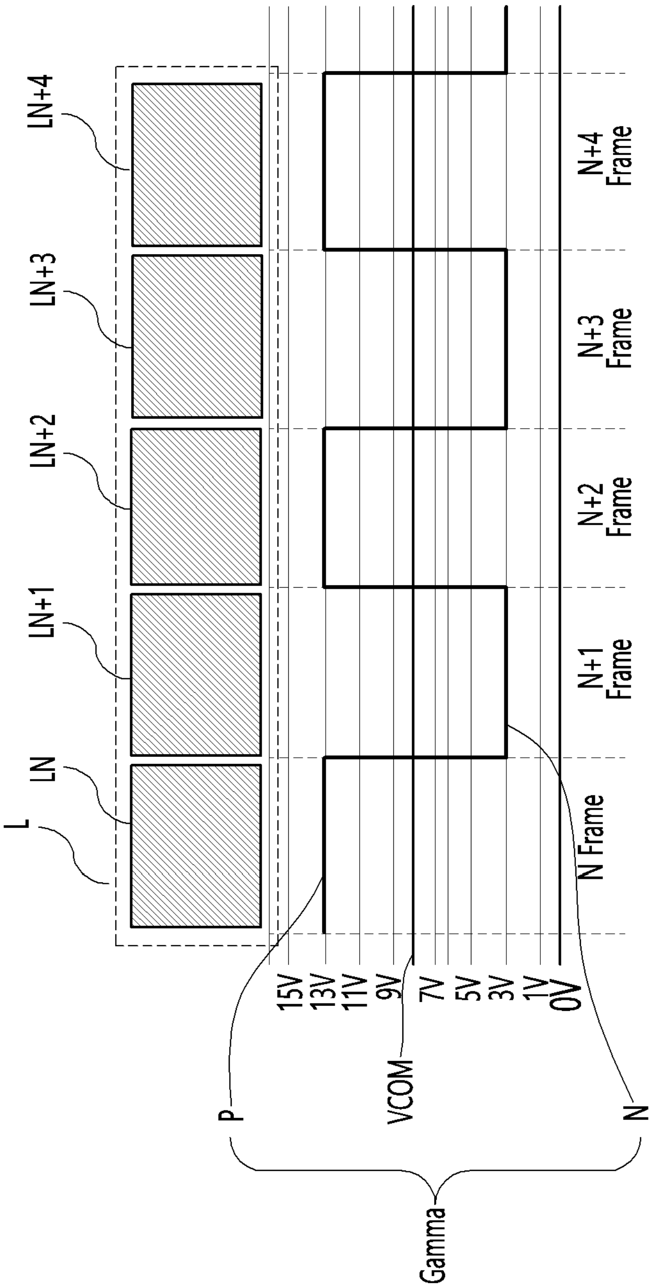
FIG. 5 is a diagram illustrating a display voltage per frame and luminance per frame of a display device according to an embodiment of the present disclosure.

FIG. 5 is a diagram illustrating a display voltage per frame and luminance per frame of a display device according to an embodiment of the present disclosure.

A video output to the display 180 may consist of a plurality of frames. For example, when frames per second in a video output to the display 180 is 60 Hz, 60 frames per second may be output.

FIG. 5 shows display voltages for periods in which an N-th frame to an (N+4)-th frame (N Frame, N+1 Frame, N+2 Frame, N+3 Frame, and N+4 Frame) are displayed. The (N+1)-th frame (N+1 Frame) may be a frame immediately subsequent to the N-th frame (N Frame). The (N+2)-th frame (N+2 Frame) may be a frame immediately subsequent to the (N+1)-th frame (N+1 Frame). The (N+3)-th frame may be a frame immediately subsequent to the (N+3)-th frame (N+2 Frame). The (N+4)-th frame may be a frame immediately subsequent to the (N+4)-th frame (N+3 Frame).

The luminance (L) of a screen displayed on the display 180 may vary according to a difference in voltages applied to liquid crystal electrodes. The difference between the voltages applied to the liquid crystal electrodes may be the difference between the common gamma voltage VCOM and the gamma voltage Gamma.

The luminance (L) of the screen displayed on the display 180 may vary according to a degree of opening of the liquid crystal. The more the liquid crystal is opened, the greater the amount of light transmitting the display 180, so that the luminance may be high. The degree of opening of the liquid crystal may vary depending on the difference between the common gamma voltage VCOM and the gamma voltage Gamma.

As the difference between the common gamma voltage VCOM and the gamma voltage Gamma increases, the degree of opening of the liquid crystal of the display 180 may increase. Accordingly, the luminance (L) of the screen displayed on the display 180 may increase as the difference between the common gamma voltage VCOM and the gamma voltage Gamma increases.

For example, when the common gamma voltage VCOM is 8V and the gamma voltage Gamma is 15V, which is the maximum voltage, the difference between the liquid crystal electrodes is 7V. When the gamma voltage Gamma is 15V, the gamma voltage Gamma may be a positive gamma voltage (P). When the difference between the liquid crystal electrodes is 7V, the screen may be displayed with maximum brightness.

Alternatively, when the common gamma voltage VCOM is 8V and the gamma voltage Gamma is 1V, which is the minimum voltage, the difference between the liquid crystal electrodes is 7V. When the gamma voltage Gamma is 1V, the gamma voltage Gamma may be a negative gamma voltage (N). When the difference between the liquid crystal electrodes is 7V, the screen may be displayed with maximum brightness.

The screen displayed with maximum brightness may be a screen with a 8-bit gray level of 255.

In all frames, the common gamma voltage VCOM may be 8V.

Periods corresponding to the N-th frame (N Frame), the (N+2)-th frame (N+2 Frame), and the (N+4)-th frame (N+4 Frame) may be positive periods of a sub-pixel. In the N-th frame (N Frame), the (N+2)-th frame (N+2 Frame), and the (N+4)-th frame (N+4 Frame), the gamma voltage Gamma may be a positive gamma voltage (P). The positive gamma voltage (P) may be 13V. A difference between the positive gamma voltage P and the common gamma voltage VCOM may be 5V.

Periods corresponding to the (N+1)-th frame (N+1 Frame) and the (N+3)-th frame (N+3 Frame) may be negative periods of a sub-pixel. In the (N+1)-th frame (N+1 Frame), the (N+3)-th frame (N+3 Frame), the gamma voltage Gamma may be a negative gamma voltage (N). The negative gamma voltage (N) may be 3V. A difference between the negative gamma voltage (N) the common gamma voltage VCOM may be 5V.

A difference between the gamma voltage (Gamma) and the common gamma voltage (VCOM) in all frames may be 5V.

That is, the difference between the gamma voltage (Gamma) and the common gamma voltage (VCOM) may be the same in all frames. Accordingly, it can be seen that the luminance (L) is the same in all frames.

When the luminance (L) of each frame is the same as in FIG. 5, there may be no problem that flicker phenomenon occurs.

However, there may be cases in which the voltage of the display device 100 fluctuates. For example, the display device 100 may suffer heating due to operation of the display device 100 for a long time, other environmental changes, or deterioration of internal components. Due to heating of the display device 100, the display voltage may fluctuate.

In relation to this, descriptions will be given with reference to FIG. 6.

Figure 6:
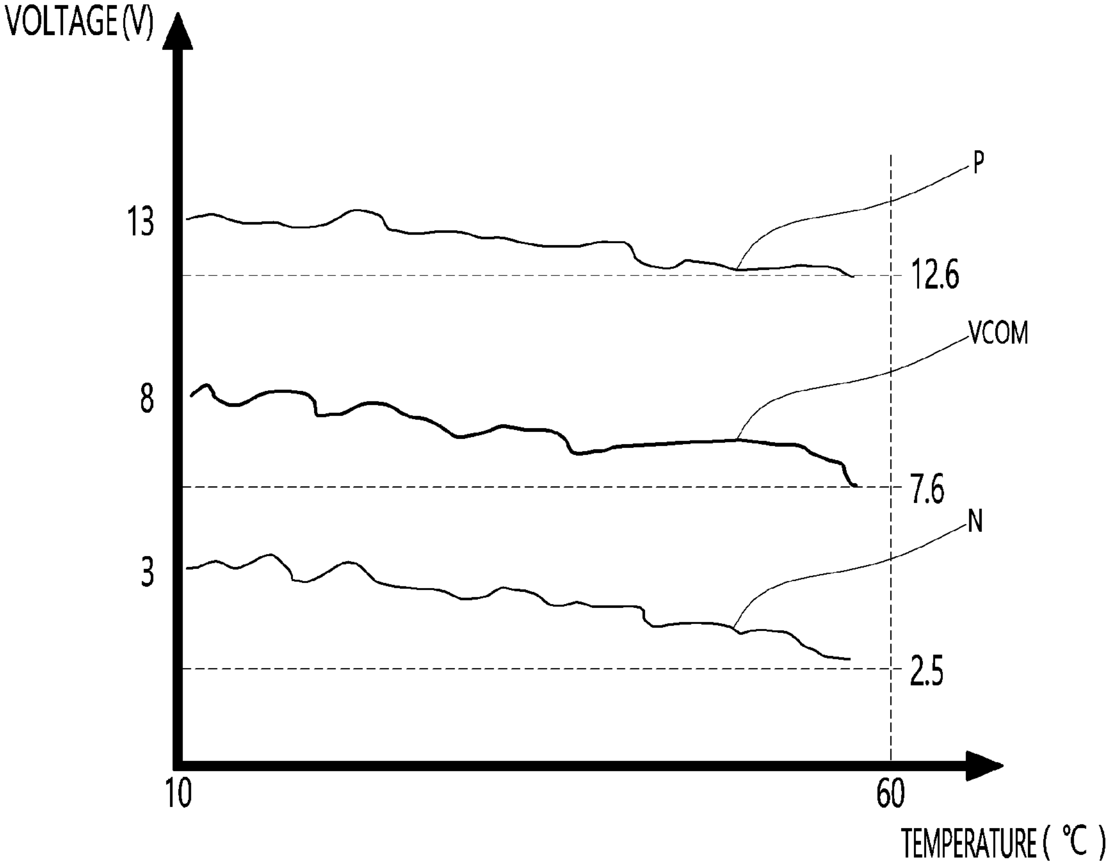
FIG. 6 is a diagram for describing a variation of a display voltage of a display device according to an embodiment of the present disclosure.

FIG. 6 is a diagram for describing a variation of a display voltage of a display device according to an embodiment of the present disclosure.

The x-axis of the graph shown in FIG. 5 may represent a temperature of the display device 100. The temperature of the display device 100 may increase as the operation time of the display device 100 increases.

Also, the y-axis of the graph shown in FIG. 6 may represent a display voltage.

Referring to FIG. 6, the common gamma voltage VCOM may be 8V when the temperature of the display device 100 is 10° C. Also, the common gamma voltage VCOM may be 7.6V when the temperature of the display device 100 is 60° C. It can be seen that the voltage of the common gamma voltage (VCOM) has decreased by 0.4V.

The positive gamma voltage (P) may be 13V when the temperature of the display device 100 is 10° C. Also, the positive gamma voltage (P) may be 12.6V when the temperature of the display device 100 is 60° C. It can be seen that the voltage of the positive gamma voltage (P) has decreased by 0.4V.

The negative gamma voltage (N) may be 3V when the temperature of the display device 100 is 10° C. Also, the negative gamma voltage N may be 2.5V when the temperature of the display device 100 is 60° C. It can be seen that the negative gamma voltage (N) has decreased by 0.5V.

As described above, the display voltage may fluctuate during operation of the display device 100.

Also, due to various use environments of the display device 100 or deterioration of internal components, the display voltage may fluctuate non-constantly.

The common gamma voltage VCOM, the positive gamma voltage (P), and the negative gamma voltage (N) may increase or decrease as described in FIG. 6. In addition, the degree of increase or decrease of the common gamma voltage VCOM, the positive gamma voltage (P), and the negative gamma voltage (N) may be diverse.

Next, a case in which luminance of frames of a video displayed by the display device 100 according to an embodiment of the present disclosure are different will be described.

Figure 7:
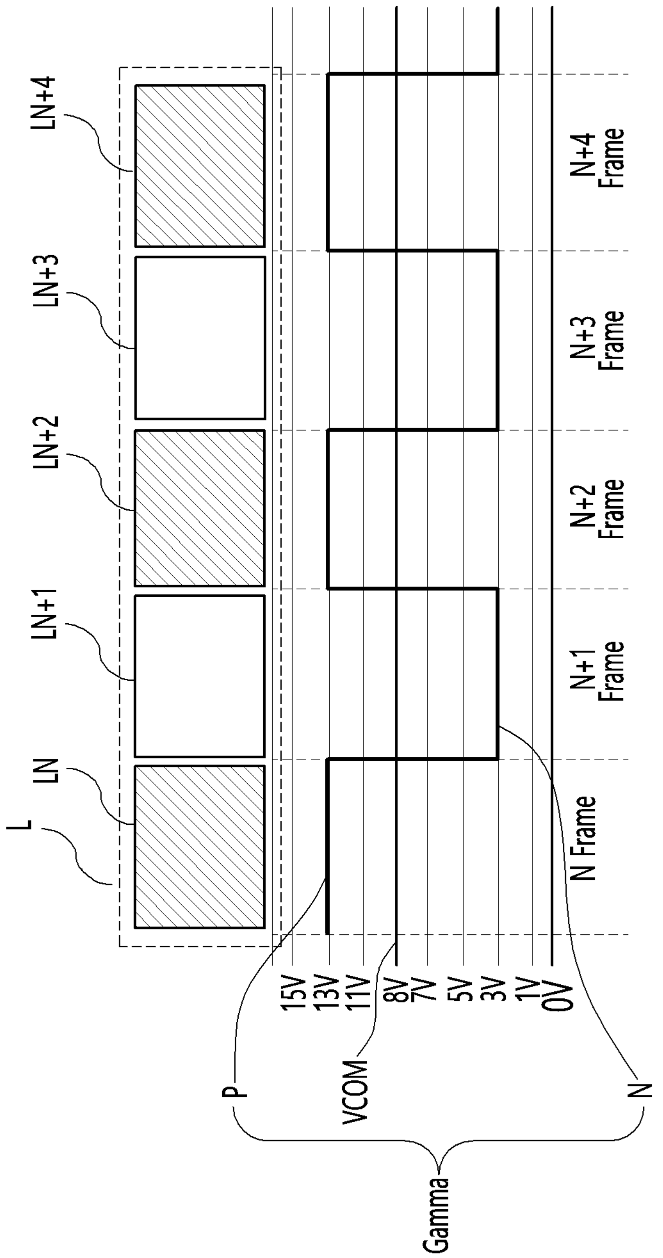
FIG. 7 is a diagram illustrating a display voltage for each frame and luminance for each frame when heating occurs in the display device of FIG. 5.

FIG. 7 is a diagram illustrating a display voltage for each frame and luminance for each frame when heating occurs in the display device of FIG. 5.

FIG. 7 shows periods in which the N-th frame to the (N+4)-th frame (N Frame, N+1 Frame, N+2 Frame, N+3 Frame, and N+4 Frame) are displayed.

In all frames, the common gamma voltage VCOM may be 9V. It can be seen that the common gamma voltage VCOM of FIG. 6 and the common gamma voltage VCOM of FIG. 5 are different.

In the N-th frame (N Frame), the (N+2)-th frame (N+2 Frame), and the (N+4)-th frame (N+4 Frame), the gamma voltage Gamma may be a positive gamma voltage (P). The positive gamma voltage (P) may be 13V.

A difference between the positive gamma voltage P and the common gamma voltage VCOM may be 4V.

In the (N+1)-th frame (N+1 Frame), the (N+3)-th frame (N+3 Frame), the gamma voltage Gamma may be a negative gamma voltage (N). The negative gamma voltage (N) may be 3V.

A difference between the negative gamma voltage (N) the common gamma voltage VOCM may be 6V.

It can be seen that the difference between the gamma voltage (Gamma) for each of frames of the positive period and the frames of the negative period and the common gamma voltage VCOM is different.

Accordingly, the luminance (L) of the frame of the positive period and the frame of the negative period may be different. Referring to FIG. 7, it can be seen that the luminance of the N-th frame (LN), the luminance of the (N+2)-th frame (LN+2), the luminance of the (N+4)-th frame (LN+4), and the luminance of the (N+1)-th frame (LN+1), and the luminance (LN+3) of the (N+3)-th frame are different.

Accordingly, when the N-th frame (N Frame) to the (N+4)-th frame (N+4 Frame) are displayed in order, the luminance (L) may also be changed differently each time the frame is switched. As the luminance L is changed differently each time the frame is switched, flicker noise may occur.

Accordingly, the display device 100 according to an embodiment of the present disclosure is to minimize the flicker noise caused by a luminance difference in frame by performing training to calibrate a display voltage according to the temperature.

Figure 8:
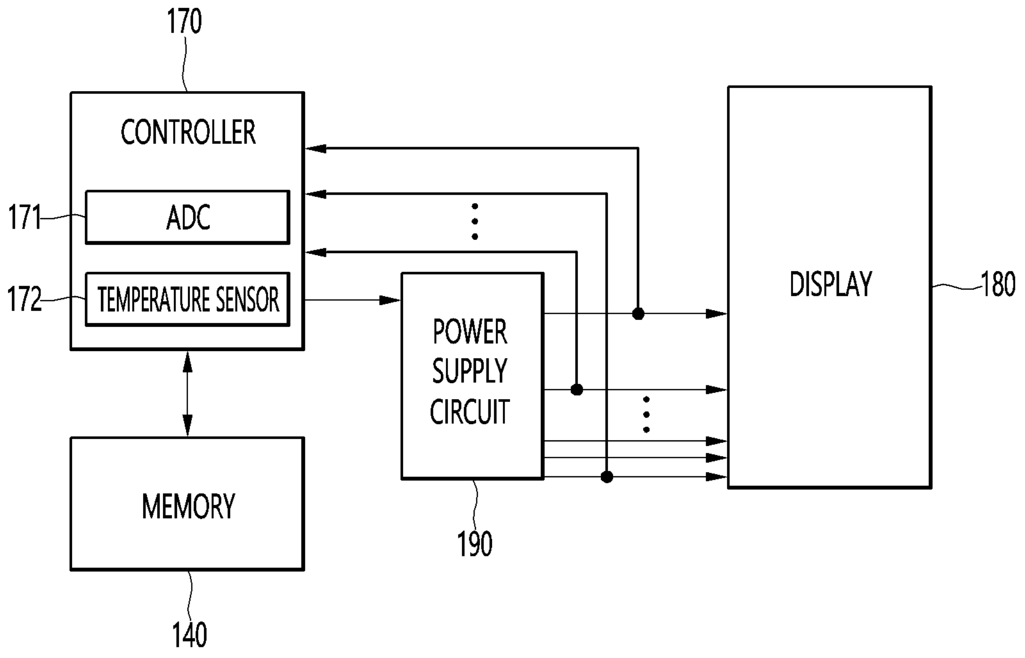
FIG. 8 is a block diagram illustrating a configuration of a display device according to an embodiment of the present disclosure.

FIG. 8 is a block diagram illustrating a configuration of a display device according to an embodiment of the present disclosure.

The display device 100 according to an embodiment of the present disclosure may include some or all of a memory 140, a controller 170, an analog-to-digital converter (ADC) 171, a temperature sensor 172, a display 180, and a power supply circuit 190.

The controller 170 may be implemented in the form of a System On Chip (SoC). The controller 170 may include at least some or all of the ADC 171 and the temperature sensor 172. Alternatively, some or all of the ADC 171 and the temperature sensor 172 may be provided outside the controller 170.

The controller 170 may sense a temperature of the display device 100 and store the sensed temperature.

The controller 170 may sense an initial temperature of the display device 100. The initial temperature of the display device 100 may be a temperature of the display device 100 at the time when power of the display device 100 is turned on.

The temperature of the display device 100 may be a temperature of a certain region inside the display device 100. Alternatively, the temperature of the display device 100 may be a temperature of one of internal components. For example, the temperature of the display device 100 may be a temperature of an SoC.

The controller 170 may output a gray pattern to the display 180 when receiving a user input for turning off the power of the display device 100.

The controller 170 may obtain a display voltage according to the gray pattern. The controller 170 may obtain a display voltage according to the output of the gray pattern through a port of the ADC 171.

The controller 170 may convert the obtained display voltage into a digital value.

The controller 170 may calibrate the display voltage which has been converted into a digital value. The controller 170 may store a calibrated voltage value obtained by calibrating the display voltage in the memory 140. In addition, the controller 170 may store the calibrated voltage value and the temperature at the time when the user input for turning off the power is received, together.

The power supply circuit 190 may supply a voltage to the display 180. The power supply circuit 190 may supply a voltage to the display 180 based on the calibrated voltage value.

Next, a method of obtaining a calibrated voltage value and outputting a voltage to a display based on the calibrated voltage value in a display device according to an embodiment of the present disclosure will be described in detail.

Figure 9:
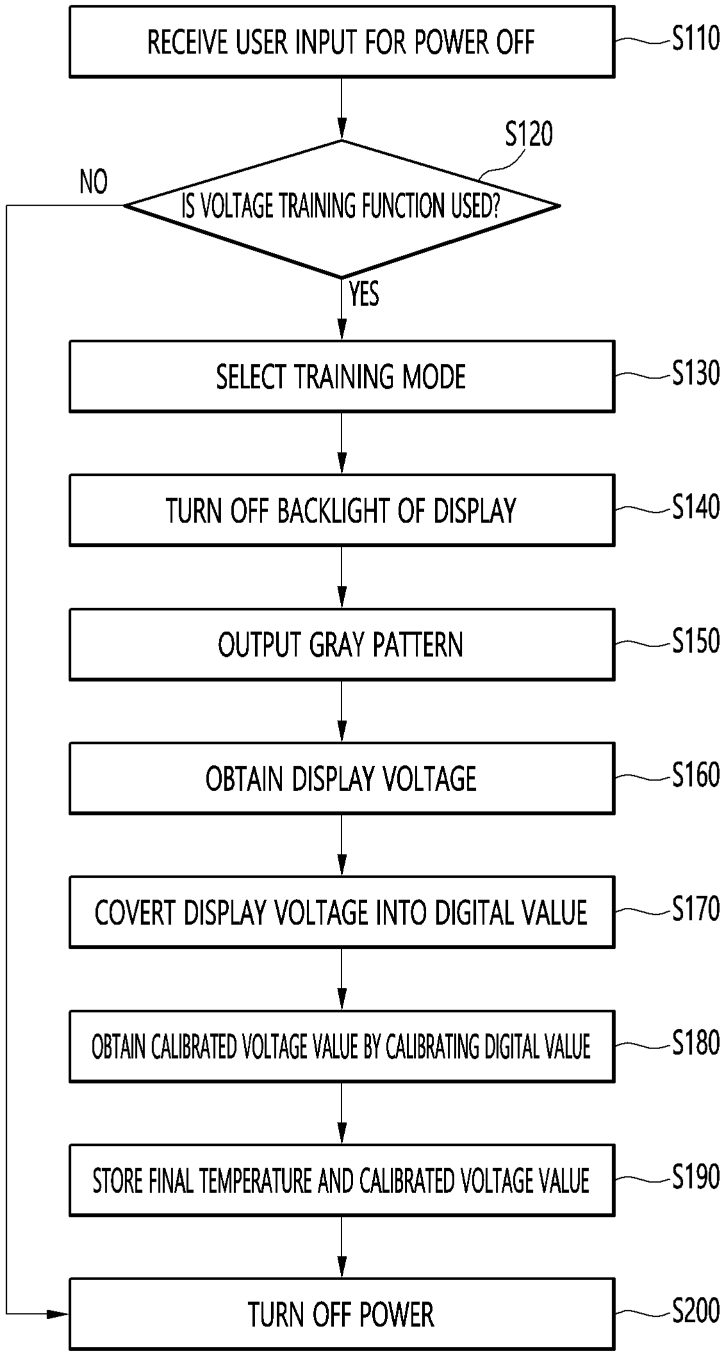
FIG. 9 is a flowchart for describing a method of obtaining and storing a calibrated voltage value in a display device according to an embodiment of the present disclosure.

FIG. 9 is a flowchart for describing a method of obtaining and storing a calibrated voltage value in a display device according to an embodiment of the present disclosure.

The controller 170 may receive a user input for turning off power of the display device 100 (S110).

The user input for turning off the power of the display device 100 may include a touch input through the display 180 or an input using a remote control device 200.

However, this is only an example, and a user input for turning off the power of the display device 100 may be performed in various ways.

The controller 170 may receive a user input for selecting whether to use a voltage training function (S120).

The voltage training function may be a function that the controller 170 automatically performs training to adjust a display voltage according to a change in internal temperature of the display device 100.

The controller 170 may receive a user input for selecting whether or not to use the voltage training function whenever an input for turning off the power of the display device 100 is received. To this end, the controller 170 may display a pop-up window (not shown).

When receiving a user input for using the voltage training function, the controller 170 may receive a user input for selecting a training mode (S130).

The training mode may include a normal mode and a precision mode. The normal mode and the precision mode will be described in detail in S150.

The controller 170 may turn off the backlight of the display 180 (S140).

Accordingly, it may seem as if no image is output on the display 180. Since it is seem as if no image is output on the display 180, the controller 170 may perform voltage training without disturbing a user.

The controller 170 may output a gray pattern (S150).

The gray pattern output by the controller 170 may be a gray pattern previously stored in the memory 140. However, it is not limited thereto, and the controller 170 may output a gray pattern received from the outside.

The gray pattern may be a color model representing a black and white image according to a pixel brightness. The gray pattern may be displayed closer to white as the brightness of a pixel is lower, and displayed closer to black as the brightness of a pixel is higher.

The gray pattern may include data of a predetermined number of bit per pixel. For example, an 8-bit gray pattern may contain 8 bits of data per pixel. An 8-bit gray pattern may include gray-scales of 1 to 255 gray levels. As the gray level is closer to 1, the grayscale has lower brightness, and the closer the gray level is to 255, the higher the grayscale is.

The controller 170 may output a gray pattern to a back end. Accordingly, the gray pattern may not be displayed on the display 180. In this case, it is seem as if the display 180 is inoperative. As a result, it is possible not to disturb a user who has made a user input for turning off the power of the display device 100.

The controller 170 may output different numbers of gray patterns based on a user input for selecting a training mode.

The controller 170 may output one gray pattern when receiving a user input for selecting the normal mode. When the controller 170 outputs one gray pattern, there is no need to store a plurality of gray patterns in the memory 140, thus saving the capacity of the memory 140.

When outputting one gray pattern, the controller 170 may output a gray pattern having an intermediate gray level. For example, the controller 170 may output a gray pattern having a 128-gray level among 8-bit gray patterns. The controller 170 may output a gray pattern having an intermediate gray level to simply calibrate a display voltage by reflecting characteristics of all gray levels.

The controller 170 may output a plurality of gray patterns when receiving a user input for selecting the precision mode. The controller 170 may calibrate display voltages for various gray levels by using a plurality of gray patterns. Accordingly, it is possible to more precisely calibrate a display voltage compared to a case of using one gray pattern.

When outputting a plurality of gray patterns, the controller 170 may output a plurality of gray patterns having preset gray level intervals.

For example, the controller 170 may output gray patterns having gray levels of 64, 128, 192, and 255 among 8-bit gray patterns having gray levels of 0 to 255. However, this is only an example, and the present disclosure is not limited thereto.

As the controller 170 outputs a plurality of gray patterns having preset level intervals, it is possible to obtain a calibrated voltage value applicable to all gray levels using the minimum number of gray patterns.

According to an embodiment, the controller 170 may output gray patterns of all gray levels. Accordingly, the display device 100 according to an embodiment of the present disclosure may minimize the flicker phenomenon by calibrating display voltages for all gray levels.

As the number of gray patterns output by the controller 170 to correct the display voltage increases, the effect of preventing the flicker phenomenon may increase. It is noted that the burden on the amount of calculation of the display device 100, the capacity of the memory 140, and the time required for the calibration process may also increase.

Accordingly, the controller 170 may output different numbers of gray patterns in order to precisely calibrate the display voltage or to minimize the load on the amount of calculation of the display device 100, the capacity of the memory 140, and the time required for the calibration process.

The controller 170 may obtain a display voltage according to a gray pattern (S160).

The controller 170 may obtain at least one of a common gamma voltage, a positive gamma voltage, and a negative gamma voltage according to the gray pattern.

When outputting a plurality of gray patterns, the controller 170 may obtain at least one of a common gamma voltage, a positive gamma voltage, and a negative gamma voltage according to each gray pattern.

The controller 170 may obtain a display voltage through a port of the ADC 171. The display voltage obtained by the controller 170 may be an analog value.

The controller 170 may convert the obtained display voltage into a digital value (S170).

The controller 170 may convert the display voltage into a digital value using the ADC 171.

Since the analog value is a continuous value, the load of the controller 170, the memory 140, or a buffer (not shown) for calibrating or storing the display voltage obtained as an analog value may be large.

Accordingly, the controller 170 may convert a display voltage into a digital value and use the digital value.

The controller 170 may obtain a calibrated voltage value by calibrating the display voltage (S180), and store a final temperature and the calibrated voltage value (S190).

For example, the controller 170 may calibrate the display voltage such that a difference between the positive voltage and the common gamma voltage and a difference between the negative voltage and the common gamma voltage are equal to each other. Alternatively, the controller 170 may calibrate the display voltage such that the common gamma voltage has an intermediate value between the positive gamma voltage and the negative gamma voltage.

However, this is only an example, and a method of calibrating the display voltage in the controller 170 may be included within the scope of the present disclosure within a range in which the calibrated voltage value is calibrated to prevent the flicker phenomenon.

Meanwhile, the common gamma voltage, the positive gamma voltage, and the negative gamma voltage included in the display voltage may vary independently. Accordingly, the controller 170 may respectively obtain calibrated voltage values for the common gamma voltage, the positive gamma voltage, and the negative gamma voltage.

That is, the controller 170 may obtain a calibrated voltage value by calibrating at least one of the common gamma voltage, positive gamma voltage, and negative gamma voltage. The calibrated voltage value may include at least one of a calibrated voltage value of the common gamma voltage, a calibrated voltage value of the positive gamma voltage, and a calibrated voltage value of the negative gamma voltage.

Next, a method of obtaining a calibrated voltage value in the controller 170 will be described in detail.

First, an example of a method of calibrating a common gamma voltage in the controller 170 will be described.

The controller 170 may obtain a positive gamma voltage of 13.6V. The controller 170 may convert 13.6V into a digital value of 232. The controller 170 may obtain a negative gamma voltage of 2.2V. The controller 170 may convert 2.2V into a digital value of 37.

The controller 170 may obtain a calibrated voltage value of the common voltage through an equation of {(positive gamma voltage+negative gamma voltage)/2}. The calibrated voltage value of the common gamma voltage may be 134.5.

Next, an example of a method of calibrating a gamma voltage in the controller 170 will be described.

The controller 170 may calibrate a display voltage based on the variation in the gamma voltage. The controller 170 may calibrate a gamma voltage based on the variation in the gamma voltage. The variation in the gamma voltage may be a difference between an initial voltage and a final voltage of the gamma voltage.

The initial voltage may be a preset display voltage when designing or manufacturing the display device 100. The initial voltage may be a display voltage output to the display 180 when the power of the display device 100 is turned on.

The final voltage may be the gamma voltage at the time when a user input for turning off power of the display 100 is received.

The controller 170 may calibrate a display voltage based on an average variation in the positive gamma voltage and an average variation in the negative gamma voltage. The controller 170 may calibrate at least one of the positive gamma voltage and the negative gamma voltage based on the average variation in the positive gamma voltage and the average variation in the negative gamma voltage.

The controller 170 may obtain an average variation based on the variation in the positive gamma voltage and the variation in the negative gamma voltage.

The variation in the positive gamma voltage may be a difference between an initial voltage and a final voltage of the positive gamma voltage. For example, when the initial voltage of the positive gamma voltage is 13V and the final voltage is 12.7V, the variation in the positive gamma voltage may be 0.3V.

The variation in the negative gamma voltage may be a difference between an initial voltage and a final voltage of the negative gamma voltage. For example, when the initial voltage of the negative gamma voltage is 3V and the final voltage is 2.8V, the variation in the negative gamma voltage may be 0.2V.

The average variation may be an average of the variation in the positive gamma voltage and the variation in the negative gamma voltage. For example, the variation in the positive gamma voltage may be 0.3V, and the variation in the negative gamma voltage may be 0.2V. Accordingly, the average variation may be 0.25V.

The controller 170 may perform calibration such that the positive gamma voltage is obtained by subtracting the average variation from an initial voltage of the positive gamma voltage. For example, when the initial voltage of the positive gamma voltage is 13V and the average of the variations of the gamma voltage is 0.25V, the calibrated voltage value of the positive gamma voltage may be 12.75V. Since the current voltage of the positive gamma voltage is 12.7V, the calibrated voltage value may be a value calibrated to be higher than the current voltage by 0.25V.

The controller 170 may perform calibration such that the negative gamma voltage is obtained by subtracting the average variation from an initial voltage of the negative gamma voltage. For example, when the initial voltage of the negative gamma voltage is 3V and the average of the variations of the gamma voltage is 0.25V, the calibrated voltage value of the negative gamma voltage may be 2.75V. Since the current voltage of the positive gamma voltage is 2.8V, the calibrated voltage value may be a value calibrated to be lower than the current voltage by 0.05V.

Meanwhile, when the controller 170 obtains the calibrated voltage values in the precision mode, the controller 170 may obtain calibrated voltage values for all of a plurality of gray patterns having different gray levels.

The controller 170 may store the obtained calibrated voltage value and the final temperature of the display device 100 in the memory 140. The final temperature may be a temperature at the time when a user input for turning off power is received.

According to an embodiment, the final temperature may be a temperature at the time when the controller 170 obtained the calibrated voltage value. Alternatively, the final temperature may be a temperature at the time when the controller 170 turns off the power of the display device 100.

The controller 170 may turn off the power of the display device 100 (S200).

The controller 170 may turn off the power of the display device 100 after storing the final temperature and the calibrated voltage value in the memory 140.

The controller 170 may perform S120 to S200 whenever a user input for turning off the power of the display device 100 is received.

According to an embodiment, the controller 170 may not display a pop-up window (not shown) when receiving a user input for using the voltage training function once in S120 and then receiving a user input for turning off the power. The controller 170 may automatically perform a voltage training operation without receiving indication as to whether or not to use the voltage training function.

According to an embodiment, the controller 170 may not perform S120 to S200 when the calibrated voltage value obtained at the same temperature as the final temperature of the display device 100 is already stored.

Summarizing FIG. 9, the display device 100 according to an embodiment of the present disclosure may obtain a display voltage according to a gray pattern. Next, the controller 170 may obtain a calibrated voltage value by correcting the display voltage, and store the calibrated voltage value and final temperature.

Next, referring to FIG. 10, a method of outputting a display voltage based on a calibrated voltage value during operation of a display device according to an embodiment of the present disclosure will be described.

Figure 10:
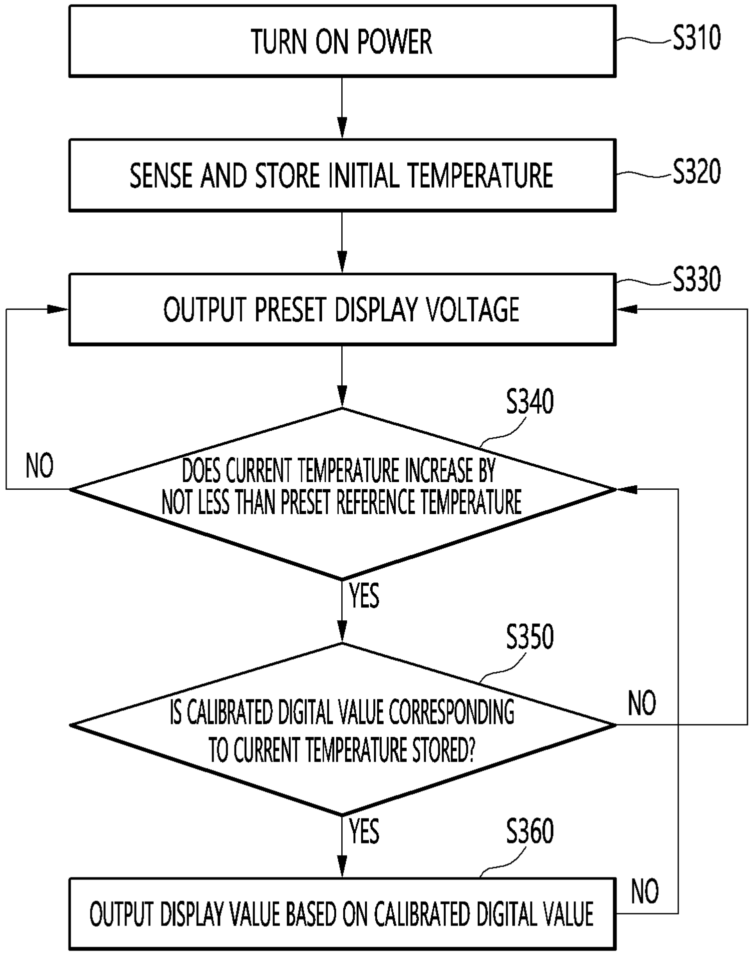
FIG. 10 is a flowchart for describing a method of outputting a display voltage based on a calibrated voltage value in a display device according to an embodiment of the present disclosure.

FIG. 10 is a flowchart for describing a method of outputting a display voltage based on a calibrated voltage value in a display device according to an embodiment of the present disclosure.

When the power of the display device 100 is turned on (S310), the controller 170 may sense and store an initial temperature (S320).

The controller 170 may store the sensed initial temperature in the memory 140.

The initial temperature may be a temperature at the time when power of the display device 100 is turned on.

The controller 170 may output a preset display voltage (S330).

The preset display voltage may be a common gamma voltage and a gamma voltage according to initial settings of the display device 100.

The preset display voltage may be an initial voltage. The preset display voltage may be a preset display voltage when designing or manufacturing the display device 100.

The controller 170 may sense a current temperature of the display device 100. The current temperature may be a temperature at a time when the controller 170 senses the temperature while the display device 100 is operating.

The controller 170 may periodically sense the current temperature of the display device 100. A cycle at which the controller 170 senses a current temperature of the display device 100 may be determined in consideration of an average increase in temperature according to an operating time of the display device 100.

According to an embodiment, the controller 170 may sense the current temperature of the display device 100 in real time.

The controller 170 may obtain an indication as to whether the current temperature increases by not less than a preset reference temperature or more from the initial temperature (S340).

The controller 170 may compare the initial temperature stored in the memory 140 with the current temperature, and obtain the indication as to whether the current temperature is higher than the initial temperature by not less than the preset temperature.

The preset reference temperature may be a temperature for identifying a section in which the display voltage fluctuates beyond a preset level. For example, the preset reference temperature may be 10° C. However, this is only an example, and the reference temperature may be set in various ways or to temperatures in consideration of the type of display device 100 or use environment.

The controller 100 may continuously output a preset display voltage when the current temperature does not increase by not less than a preset reference temperature from the initial temperature.

For example, when the initial temperature is 10° C. and the current temperature is 15° C., the controller 170 may continuously output the preset display voltage.

The controller 170 may obtain an indication as to whether a calibrated voltage value corresponding to the current temperature is stored when the current temperature increases by not less than the preset reference temperature from the initial temperature (S350).

For example, when the initial temperature is 10° C. and the current temperature is 25° C., the controller 170 may obtain an indication as to whether a calibrated voltage value corresponding to the current temperature is stored in the memory 140.

The controller 170 may continuously output a preset display voltage when the calibrated voltage value corresponding to the current temperature is not stored in the memory 140.

The controller 170 may output a display voltage based on the calibrated voltage value corresponding to the current temperature when the calibrated voltage value corresponding to the current temperature is stored in the memory 140.

When the calibrated voltage value corresponding to the current temperature is stored in the memory 140, the controller 170 may output a display voltage based on the calibrated voltage value corresponding to the current temperature.

The calibrated voltage value corresponding to the current temperature may be a calibrated voltage value obtained at the final temperature equal to the current temperature. Alternatively, the calibrated voltage value corresponding to the current temperature may be a calibrated voltage value stored together with the final temperature equal to the current temperature.

Also, the calibrated voltage value corresponding to the current temperature may be a calibrated voltage value obtained at a final temperature closest to the current temperature. Alternatively, the calibrated voltage value corresponding to the current temperature may be a calibrated voltage value stored together with a final temperature closest to the current temperature.

The calibrated voltage value corresponding to the current temperature will be described with reference to FIG. 11.

Figure 11:
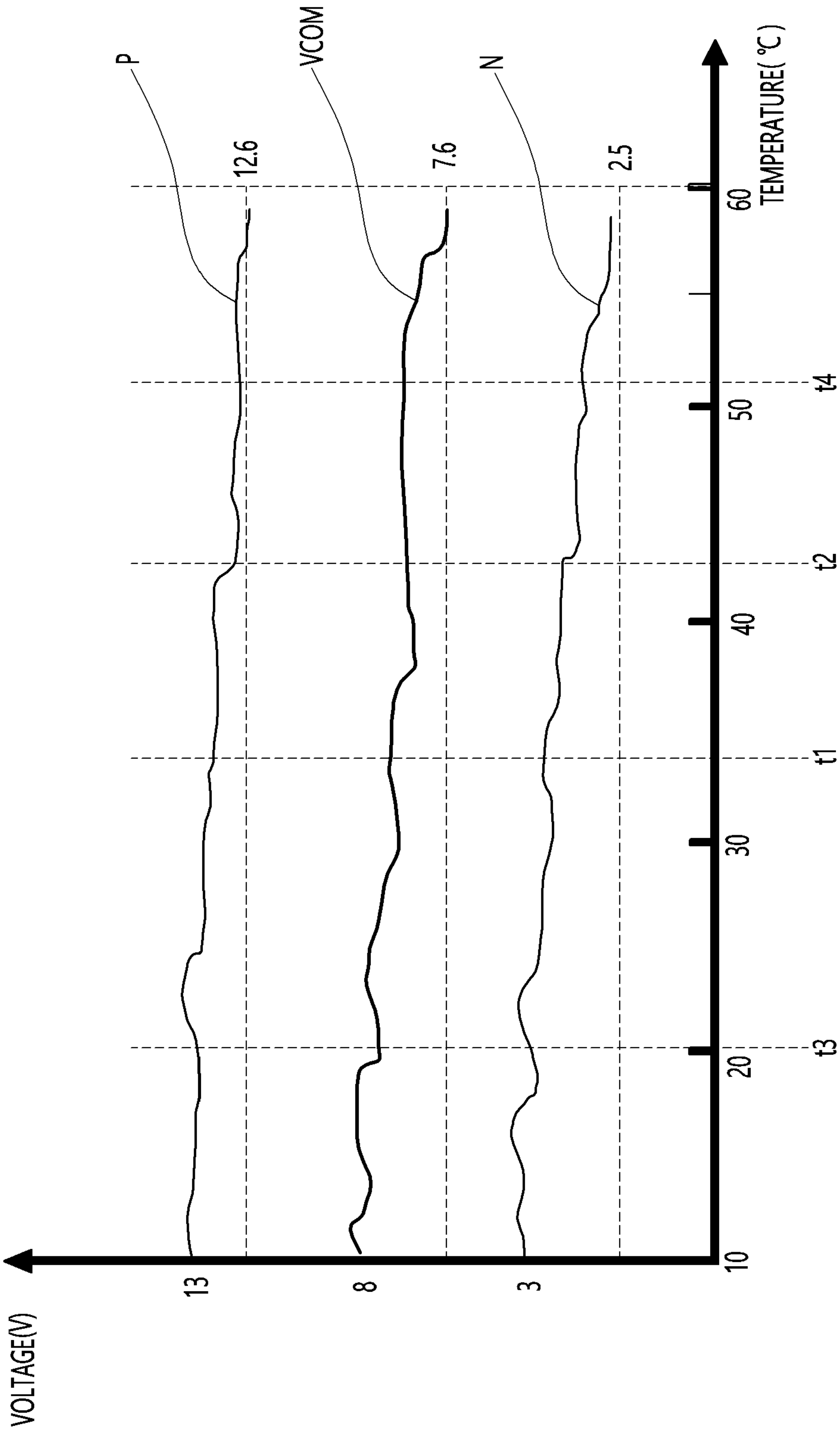
FIG. 11 is a diagram for describing a final temperature at which a calibrated voltage value is obtained according to an embodiment of the present disclosure.

FIG. 11 is a diagram for describing a final temperature at which a calibrated voltage value is obtained according to an embodiment of the present disclosure.

In FIG. 11, first to fourth temperatures t1, t2, t3, and t4 may be final temperatures.

The first temperature t1 may be a final temperature at which the first calibrated voltage value is obtained. The first temperature t1 may be 33° C.

The second temperature t2 may be a final temperature at which the second calibrated voltage value is obtained. The second temperature t2 may be 42° C.

The third temperature t3 may be a final temperature at which the third calibrated voltage value is obtained. The third temperature t3 may be 20° C.

The fourth temperature t4 may be a final temperature at which the fourth calibrated voltage value is obtained. The fourth temperature t4 may be 51° C.

The controller 170 may output a voltage to the display 180 based on the calibrated voltage value corresponding to a current temperature.

For example, the current temperature of the display device 100 obtained by the controller 170 may be 20° C. The controller 170 may output a voltage to the display 180 based on the third calibrated voltage value obtained at 20° C., which is equal to the current temperature.

Alternatively, the current temperature of the display device 100 obtained by the controller 170 may be 55° C. The controller 170 may output a voltage to the display 180 based on the fourth calibrated voltage value obtained at the fourth temperature t4, which is the final temperature closest to the current temperature, among the first to fourth temperatures t1, t2, t3, and t4.

The controller 170 may output a voltage to the display 180 based on a calibrated voltage value obtained at the final temperature closest to the current temperature as well as the final temperature equal to the current temperature.

Accordingly, even when the calibrated voltage value obtained at the final temperature equal to the current temperature is not stored, the calibrated voltage may be output to the display 180 to prevent flicker phenomenon.

In addition, since it is not necessary to store calibrated voltage values for all temperatures, the amount of calculation of the controller 170 or the storage capacity of the memory 140 may be saved.

Again, description will be given with reference to FIG. 10.

Meanwhile, when calibrated voltage values for a plurality of gray patterns are stored in the memory 140, the controller 170 may output different display voltages according to the gray scales of a screen displayed on the display 180. The controller 170 may output different display voltages according to gray levels displayed on the display 180.

Specifically, the controller 170 may output a voltage as a calibrated voltage value obtained by using a gray pattern having the same gray level as that of a screen displayed on the display 180 among the calibrated voltage values corresponding to the current temperature.

For example, when a screen of 128-gray level is displayed on the display 180, the controller 170 may output a voltage as a calibrated voltage value obtained using a gray pattern of 128-gray level.

Alternatively, the controller 170 may output a voltage using a gray pattern with two gray levels between which the gray level of a screen displayed on the display 180 is interposed, among the calibrated voltage values corresponding to the current temperature.

For example, a screen of 160-gray level may be displayed on the display 180. The two gray levels between which the 160-gray level is interposed may be a 128-gray level and a 192-gray level. The controller 170 may obtain a calibrated voltage value for the 160-gray level based on a calibrated voltage value obtained using the 128-gray level and a calibrated voltage value obtained using the 192-gray level.

For example, the calibrated voltage value of the positive gamma voltage (P) for the 128-gray level may be 12V. The calibrated voltage value of the negative gamma voltage (N) for the 128-gray level may be 4V.

Also, the calibrated voltage value of the positive gamma voltage (P) for the 192-gray level may be 13V. The calibrated voltage value of the negative gamma voltage (N) for the 192-gray level may be 3V.

The 160-gray level may be a gray level having an intermediate value between the 128-gray level and the 192-gray level. Accordingly, the controller 170 may obtain 12.5V, which is an intermediate value between 13V and 12V as a calibrated voltage value of the positive gamma voltage P for the 160-gray level. In addition, the controller 170 may obtain 3.5V, which is an intermediate value between 4V and 3V as a negative gamma voltage N for the 160-gray level.

Accordingly, when a screen of the 160-gray level is displayed on the display 180, the controller 170 may output a positive gamma voltage (P) of 13.5V and a negative gamma voltage (N) of 3.5V as voltages.

Alternatively, the controller 170 may obtain a calibrated voltage value based on the slope of a calibrated voltage value obtained using two gray levels and output a voltage.

Alternatively, the controller 170 may output a calibrated voltage value obtained at a gray level closest to the gray level of a screen displayed on the display 180 as a voltage.

Summarizing FIG. 10, when the current temperature of the display device 100 increases by not less than a preset reference temperature from the initial temperature, the display device 100 according to an embodiment of the present disclosure may output a voltage to the display 180 based on the current temperature and the calibrated correction voltage value.

Accordingly, the display device 100 according to an embodiment of the present disclosure may minimize the flicker phenomenon by calibrating and outputting a voltage even when the display voltage varies according to the current temperature.

According to an embodiment of the present disclosure, the above-described method can be implemented with codes readable by a processor on a medium in which a program is recorded. Examples of the processor-readable medium may include read-only memory (ROM), random access memory (RAM), compact disc read-only memory (CD-ROM), magnetic tape, floppy disk, and optical data storage device.

The display device described above is not limitedly applicable to the configurations and methods of the above-described embodiments, and the embodiments are configured by selectively combining all or part of the embodiments such that various modifications can be made.

What is claimed is:

1. A display device comprising:

a display;

a power supply circuit configured to supply a display voltage to the display; and a controller configured to obtain a calibrated voltage value for correcting the display voltage based on a temperature of the display device and output a voltage to the display based on the temperature of the display device and the calibrated voltage value, wherein the controller is configured to obtain a final temperature of the display device when receiving a user input for turning off power of the display device, and output at least one gray pattern to the display to obtain the display voltage.

2. The display device of claim 1, wherein the controller is configured to obtain the calibrated voltage value based on the obtained display voltage and store the final temperature and the calibrated voltage value.

3. The display device of claim 2, wherein the controller is configured to convert the obtained display voltage into a digital value and obtain the calibrated voltage value using the digital value.

4. The display device of claim 2, wherein the controller is configured to output a voltage to the display based on a calibrated voltage value corresponding to a current temperature of the display device when the current temperature increases by not less than a preset reference temperature from an initial temperature of the display device.

5. The display device of claim 4, wherein the controller is configured to output a voltage to the display based on a calibrated voltage value obtained at a final temperature equal to the current temperature.

6. The display device of claim 4, wherein the controller is configured to output a voltage to the display based on a calibrated voltage value obtained at a final temperature closest to the current temperature.

7. The display device of claim 1, wherein the controller is configured to obtain an indication as to whether to execute a voltage training mode for calibrating the display voltage when receiving the user input for turning off the power of the display device.

8. The display device of claim 7, wherein the controller is configured to:

further obtain a user input for selecting one of a normal mode or a precision mode when obtaining the indication that the voltage training mode is to be executed; and output the one gray pattern in the normal mode and output a plurality of gray patterns in the precision mode.

9. The display device of claim 8, wherein the controller is configured to output a gray pattern having an intermediate gray level among the gray patterns in the normal mode.

10. The display device of claim 8, wherein the controller is configured to output the plurality of gray patterns having preset gray level intervals in the precision mode.

11. The display device of claim 1, wherein the display voltage includes a common gamma voltage and a gamma voltage, wherein the gamma voltage includes a positive gamma voltage and a negative gamma voltage, and wherein the controller is configured to calibrate at least one of the common gamma voltage, the positive gamma voltage, or the negative gamma voltage.

12. The display device of claim 11, wherein the controller is configured to calibrate the display voltage such that a difference between the positive gamma voltage and the common gamma voltage is equal to a difference between the negative gamma voltage and the common gamma voltage.

13. The display device of claim 11, wherein the controller is configured to calibrate the display voltage such that the common gamma voltage has an intermediate value between the positive gamma voltage and the negative gamma voltage.

14. The display device of claim 11, wherein the controller is configured to calibrate the display voltage based on a variation in the positive gamma voltage and a variation in the negative gamma voltage.

15. The display device of claim 14, wherein the controller is configured to:

obtain an average variation in the positive gamma voltage and an average variation in the negative gamma voltage;

obtain a calibrated voltage value of the positive gamma voltage by subtracting the average variation from an initial voltage of the positive gamma voltage; and obtain a calibrated voltage value of the negative gamma voltage by subtracting the average variation from an initial voltage of the negative gamma voltage.

* * * * *